H. A. MOYER.
AUTOMOBILE.
APPLICATION FILED DEC. 29, 1908.
1,036,885.
Patented Aug. 27, 1912.
2 SHEETS—SHEET 2.
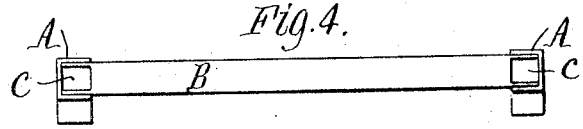
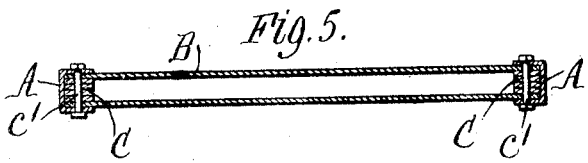
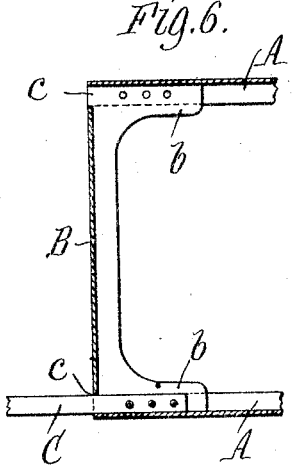
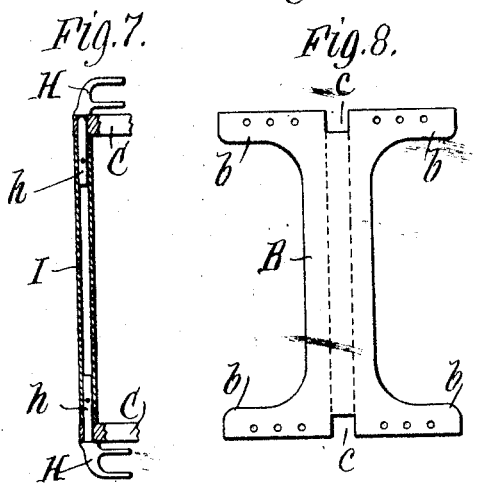
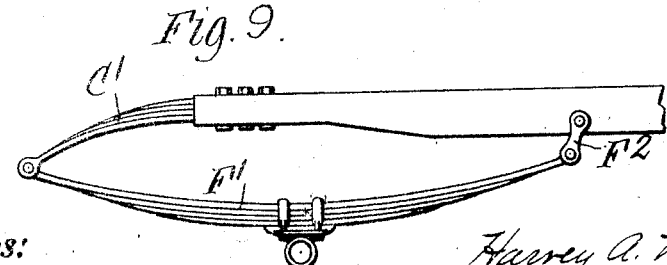
Witnesses:
E. A. Vock.
[signature]
Inventor:
Harvey A. Moyer,
by Wilhelm, Parker & Hood,
Attorneys.

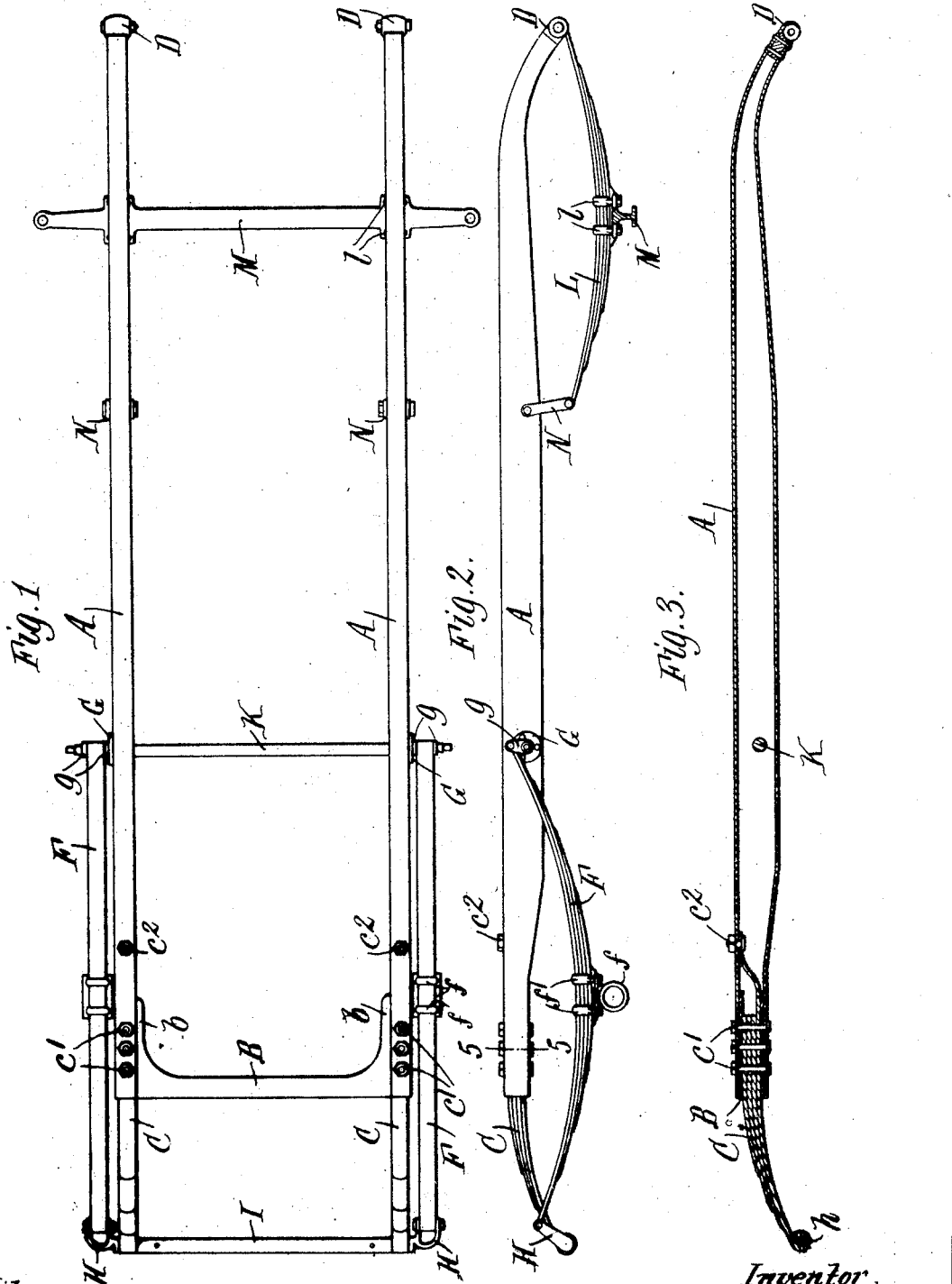

UNITED STATES PATENT OFFICE.

HARVEY A. MOYER, OF SYRACUSE, NEW YORK.

AUTOMOBILE.

1,036,885.  Specification of Letters Patent.  Patented Aug. 27, 1912.

Application filed December 29, 1908. Serial No. 469,772.

*To all whom it may concern:*

Be it known that I, HARVEY A. MOYER, a citizen of the United States, residing at Syracuse, in the county of Onondaga and State of New York, have invented a new and useful Improvement in Automobiles, of which the following is a specification.

This invention relates to the body-supporting frames and spring gears of automobiles, and has for one of its objects to improve the construction of the frame and the arrangement and construction of the springs and their connections with the frame so as to reduce the weight and cost of manufacture of the same, while at the same time improving the appearance thereof and producing a very rigid frame and strong and easy riding spring gear.

In the accompanying drawings, consisting of two sheets: Figure 1 is a plan view of an automobile frame and spring gear embodying the invention. Fig. 2 is a side elevation thereof. Fig. 3 is a longitudinal section through one of the frame side bars. Fig. 4 is a rear end elevation, on an enlarged scale, of the frame without the springs. Fig. 5 is a transverse section, on an enlarged scale, of the frame and rear springs in line 5—5, Fig. 2. Fig. 6 is a fragmentary sectional plan of the rear portion of the frame. Fig. 7 is a sectional plan view of the equalizer for the rear springs. Fig. 8 is a plan view of the blank from which the rear cross bar of the frame is made. Fig. 9 shows a modified construction of the rear springs.

Like letters of reference refer to like parts in the several figures.

The frame is made of sheet metal bent into shape and consists of two longitudinal side bars A A and a cross bar B connecting the rear portions of the side bars. The side bars are U-shaped in cross-section and arranged with the flanges projecting horizontally inward. The cross bar is also U-shaped in cross-section and is made from a substantially I-shaped blank, shown in Fig. 8, which, when bent into shape, provides end braces $b$ that extend forwardly parallel with the flanges of the side bars A to which they are secured. The cross bar is preferably made of a depth adapting its ends to fit in between the flanges of the side bars as shown, but, if desired, it could be made deep enough for its ends to straddle or receive the flanges of the side bars. Leaf springs C, secured in the rear ends of the side bars, project out rearwardly through holes $c$, Figs. 4 and 6, in the ends of the rear wall or web of the cross bar, forming spring extensions of the side bars. The thick inner ends of these springs fill the spaces between the upper and lower flanges of the cross bar, serving as spacing blocks therefor, and are secured in place by bolts $c'$ which pass through the springs and flanges of the bars and clamp the bars and springs firmly together. The end extensions of the cross bar increase its bearing along the side bars and also enable the securing bolts to be properly spaced apart. A simple but very strong and rigid connection is thus provided which prevents any twisting of the frame or springs. The thick clumsy ends of the springs are hidden from view in the side bars and this arrangement obviates the necessity for separate space blocks or other reinforcements at the corners of the frame and the separate outside brackets heretofore used for the attachment of the springs, and saves the weight of these parts as well as their cost; it permits the parts to be assembled or a broken part to be replaced with ease and despatch, and it greatly improves the appearance of the frame and springs as compared with springs connected by outside brackets and clips. The inner ends of the lower leaves of the springs C are also preferably extended inwardly and attached to the upper flanges of the side bars by bolts $c^2$ to still further add to the rigidity of the connection and prevent the springs from twisting laterally in the frame.

The front ends of the side bars A A, in the construction shown in Figs. 1–3, are reduced in depth and curved downwardly, and end forgings D are riveted between the ends of the flanges of the bars for the attachment of the front springs.

F F represent half elliptic rear springs which are secured at their middle portions to bearings $f$ for the rear axle by the usual pillow blocks and clips $f'$, or in any other suitable way. The front ends of these half springs are pivoted by bolts between the arms $g$ of brackets G which are riveted or otherwise rigidly secured to the side bars A A of the frame, and their rear ends are pivoted by bolts between the arms of shackles H which have stud pivots $h$, Fig. 7, at their lower ends bearing in eyes at the rear ends of the quarter-elliptic springs or spring extensions C of the frame side bars.

The springs F and C thus arranged and connected form a three-quarter elliptic spring at each side of the rear end of the vehicle. The half springs F are preferably arranged beside or in different planes from the quarter springs C, which enables the frame to rise and fall a greater distance than would be possible if one part of the spring was arranged over the other, thus greatly improving the spring motion of the body. The inner ends of the pivots $h$ of the shackles H at opposite sides of the vehicle are rigidly connected by an equalizing tube or rod I so that when the spring at one side of the vehicle is strained or flattened under the load thereon and the shackle at this side of the vehicle is rocked by the straightening out of the lower half spring F, the shackle at the opposite side of the vehicle will be rocked to the same extent and will cause a corresponding straightening or flattening of the spring at such opposite side of the vehicle. Consequently the springs at opposite sides of the vehicle will be strained to the same extent and cause an equal movement of both sides of the vehicle body irrespective of whether the load is borne equally by the two springs, and the body therefore will not tilt or sway sidewise if one side of the vehicle is loaded heavier than the other.

If a less expensive rear spring construction than that described is desired, lower half springs F' can be located directly under side bars of the frame and pivoted at their rear ends to ends of quarter elliptic springs C', as shown in Fig. 9. In this construction the front ends of the half springs terminate below the side bars and are attached to suitable shackles F² pivoted to the side bars.

K represents a tube or rod connecting the side bars of the frame and passing through the spring brackets G, the projecting ends thereof affording supports for the brake mechanism (not shown).

L represents half elliptic front springs which are secured at their middle portions by the usual pillow blocks and clips $l$, or otherwise, to the axle or beam M to the opposite ends of which the front wheels (not shown) are swiveled in the usual or any suitable way. An I-beam M, provided with widened parts to receive the spring clips, is shown, but a beam of any other form could be used. In the construction shown in Figs. 1–3, the front ends of the springs L are pivoted by bolts to the forgings D at the front ends of the side bars A A, and their rear ends are connected to the side bars by ordinary shackles N, the springs being located directly beneath the frame side bars. This is the preferred construction for general use, but the described construction of the spring support for the rear end of the frame is not dependent upon the particular character of the spring support for the front end of the frame and different constructions can be employed.

I claim as my invention:

1. An automobile frame comprising opposite side bars of U-shape cross-section arranged with the flanges extending inwardly, and a cross-bar of U-shape cross-section with flange extensions at its ends which extend parallel with and are secured to the flanges of the side bars, and springs which are secured between the side bar flanges and said flange extensions of the cross-bar and form spring extensions for said side bars, substantially as set forth.

2. An automobile frame comprising opposite side bars of U-shape cross-section arranged with the flanges extending inwardly, and a cross bar having flanges which extend parallel with and are secured at their ends to the flanges of said side bars, and springs, which are secured between the side bar flanges and said flanges of the cross bar and form spring extensions for said side bars, substantially as set forth.

3. An automobile frame comprising side bars and a separate cross bar, the ends of said side and cross bars having overlapping portions which are seated one within the other, spring extensions for said side bars seated within the connected ends of said side and cross bars, and securing means which extend through said connected ends of the side and cross bars and said spring extensions and rigidly clamp these parts together, substantially as set forth.

4. An automobile frame comprising hollow side bars having opposite walls which are spaced apart, a separate cross bar connecting said side bars and having flanges which are secured at their ends to said opposite walls of the side bars, springs which are secured at their inner ends between the opposite walls of said side bars and the flanges of said cross bar and form spacing blocks between said opposite walls and flanges and whose outer ends form spring extensions for said side bars, and fastening means which clamp said opposite walls and flanges to the inner ends of said springs, substantially as set forth.

Witness my hand, this 24th day of December, 1908.

HARVEY A. MOYER.

Witnesses:
E. G. LATTA,
CHESTER W. REID.